United States Patent
Trainer et al.

(10) Patent No.: US 8,704,498 B2
(45) Date of Patent: Apr. 22, 2014

(54) CONVERTER

(75) Inventors: David Trainer, Alvaston (GB); Ruchira Withanage, Stafford (GB); Robert S. Whitehouse, Stafford (GB)

(73) Assignee: Alstom Technology Ltd. (CH)

( * ) Notice: Subject to any disclaimer, the term of this patent is extended or adjusted under 35 U.S.C. 154(b) by 267 days.

(21) Appl. No.: 13/378,586

(22) PCT Filed: Jun. 15, 2009

(86) PCT No.: PCT/EP2009/057383
§ 371 (c)(1),
(2), (4) Date: Jan. 24, 2012

(87) PCT Pub. No.: WO2010/145689
PCT Pub. Date: Dec. 23, 2010

(65) Prior Publication Data
US 2012/0170338 A1    Jul. 5, 2012

(51) Int. Cl.
*H02M 7/81*    (2006.01)
(52) U.S. Cl.
USPC ................................ 323/207; 363/65; 363/89
(58) Field of Classification Search
CPC .......... H02M 7/79; H02M 7/797; H02M 7/81
USPC ............ 323/205–211; 363/65, 89, 70, 87, 35, 363/48, 129
See application file for complete search history.

(56) References Cited

FOREIGN PATENT DOCUMENTS

DE    103 23 503    12/2004

OTHER PUBLICATIONS

A. Lesnicar et al., A New Modular Voltage Source Inverter Topology, Institute of Power Electronics & Control, XP-002454302.
Silke Allebrod at al., New Transformerless, Scalable Modular Multilevel Converters for HVDC-Transmission, Institute of Power Electronics & Control.
Mauricio Beltrao De Rossiter Correa, at al., A General PWM Strategy for Four-Switch Three-Phase Inverters.

*Primary Examiner* — Harry Behm
*Assistant Examiner* — Matthew Grubb
(74) *Attorney, Agent, or Firm* — Baker & Hostetler LLP

(57) ABSTRACT

A voltage source converter (10) for use in three-phase high voltage DC power transmission and reactive power compensation. The voltage source converter (10) comprises three converter limbs (12,14,16) connected in a bridge circuit arrangement wherein each of first and second converter limbs (12,14) includes a multilevel converter (18) and a third converter limb (16) includes a capacitor (20) on each side of a series AC phase connection (22). The multilevel converters (18) are controllable to synthesize waveforms at series AC phase connections (24,26) of the first and second converter limbs (12,14).

40 Claims, 7 Drawing Sheets

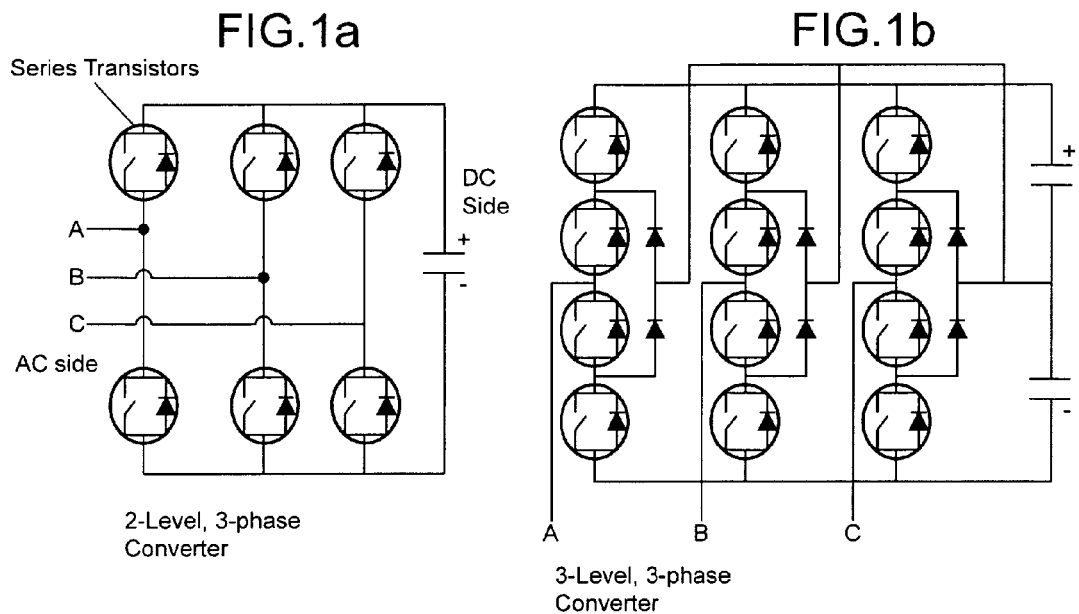
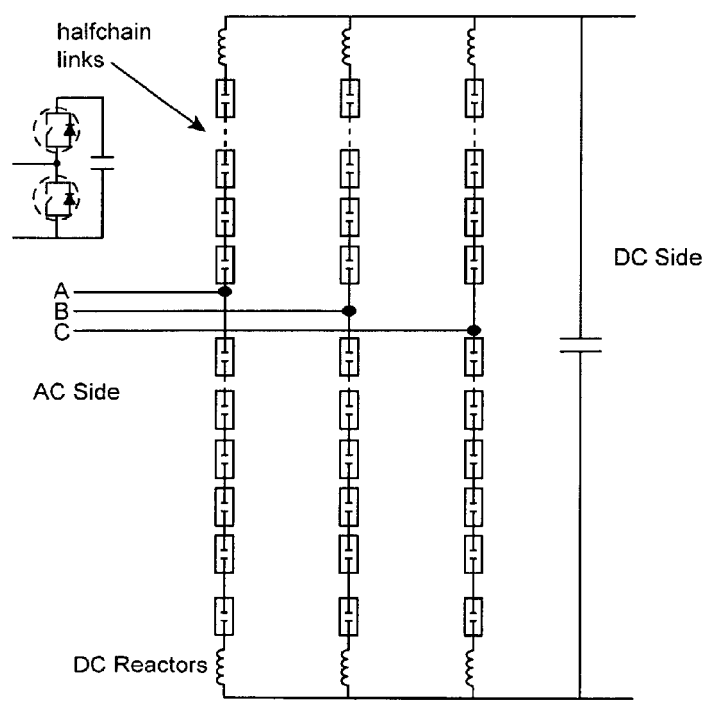

CONVERTER

The invention relates to a voltage source converter for use in three-phase high voltage direct current (HVDC) power transmission.

Three-phase power transmission is commonly used to transmit alternating current (AC) power over power lines and utilizes three alternating currents of the same frequency which reach their instantaneous peak values at different times. This delay between phases means that the power transfer is constant over each cycle.

In HVDC power transmission networks, AC power is typically converted to direct current (DC) power for transmission via overhead lines and/or under-sea cables. This conversion means that it is not necessary to compensate for AC capacitive load effects that are otherwise imposed by the transmission line or cable. This in turn reduces the cost per kilometer of the lines and/or cables and thus conversion of AC power to DC power becomes cost-effective when power needs to be transmitted over a long distance.

When AC power is converted to DC power for transmission, the DC power must then be converted back to AC power at the target HVDC station before being transmitted into local AC networks.

The conversion of DC power to and from three-phase AC power in particular requires the provision of converters at each interface between AC and DC power to effect the required conversion.

One form of converter suitable for converting DC power to AC power is a voltage source converter, the cost-effectiveness of which is dependent at least in part on the size, weight and operating efficiency of the converter.

Power conversion apparatus working at high voltages require large passive components, such as capacitors and inductors, to perform the various tasks required of them. These tasks include constraining of voltage variation and current flow regulation. The provision of electrical insulation or protective conduction shields around a converter for safety purposes can also lead to further increases in the size of a power conversion scheme.

Some voltage source converters, such as chain-link converters, have a high number of individual modules. The large size of such individual modules, and the large number of capacitive modules typically required, means that an entire power conversion scheme and HVDC station can occupy a relatively large area. The high cost of real estate means that this in itself can increase the costs of an HVDC project.

It is therefore desirable to provide a voltage source converter with reductions in equipment cost, size and weight, and improved efficiency.

One possible solution is shown schematically in FIGS. 1a and 1b and employs both conventional 6-switch (2-level) and 3-level multilevel converter topologies, with insulated gate bipolar transistors (IGBTs) connected and switched together in series to enable high power ratings of 10's-100's of MW to be realized.

This solution however may require a complex and active IGBT gate drive and large passive snubber components to ensure that the high voltage across the series strings of IGBT devices share properly during converter switching. In addition, the IGBT devices need to switch on and off several times (at high voltage) over each cycle of the AC network to control the harmonic currents being fed to the AC network.

These factors lead to high losses, high levels of electromagnetic interference and a complex design.

Another possible solution is shown schematically in FIG. 2 and employs simple converter bridges or cells connected in series, with each cell being switched at a different time.

This solution eliminates many of the problems associated with the direct switching of series connected IGBT devices because the individual bridge cells do not switch simultaneously, and the converter voltage steps are relatively small. However each cell requires a large DC link capacitor rated to carry fundamental frequency and direct current components. Six DC side reactors are also required to enable the parallel connection and operation of converter limbs, which are primarily used to limit transient current flow between capacitive converter limbs.

These factors lead to expensive, large and heavy equipment with significant amounts of stored energy. They therefore render pre-assembly, testing and transportation to site difficult.

In addition, the use of a large number of individually controlled cells means that a high number of fibre-optic communication channels are required between ground level control and the high voltage converter. This is complex, expensive and requires sophisticated designs, as well as fast and accurate processing.

Another possible solution is shown schematically in FIGS. 3a and 3b, which show a 6-switch 3-phase inverter and a 4-switch 3-phase inverter respectively.

The 6-switch 3-phase inverter shown in FIG. 3a produces a waveform at each phase A, B, and C by switching upper and lower transistors in a defined pattern, typically using sinusoidal pulse width modulation (PWM), at 120 electrical degrees apart.

The 4-switch 3-phase inverter shown in FIG. 3b operates in a similar manner as the 6-switch 3-phase inverter but the switching of the transistors associated with the A and C phases are switched 60 electrical degrees apart. In this arrangement, the remaining B phase is naturally created at the mid point of the DC link.

The 4-switch 3-phase inverter only requires control of two phases, the third phase automatically follows the waveform shape of the other two phases. The 2-level arrangement of the 4-switch 3-phase inverter is not however suitable for handling the high voltages required for HVDC power transmission.

According to an aspect of the invention there is provided a voltage source converter for use in three-phase high voltage DC power transmission and reactive power compensation, the voltage source converter comprising three converter limbs connected in a bridge circuit arrangement, wherein each of first and second converter limbs includes a multilevel converter and a third converter limb includes a capacitor on each side of a series AC phase connection, the multilevel converters being controllable to synthesize waveforms at series AC phase connections of the first and second converter limbs.

Synthesizing waveforms at the series AC phase connections of the first and second converter limbs results in the generation of a third voltage waveform at the series AC phase connection for the third converter limb, and thereby allows the construction of a converter having two controlled phases rather than three.

This in turn reduces the number of converter parts required to construct the converter, such as capacitors and inductors, because converter parts are only required for the first and second limbs rather than for all three converter limbs. The resultant converter is therefore more efficient in terms of cost, space and operation when compared to conventional three-phase converter arrangements.

The routing of communication links between the local voltage source converter controller and the global controller can also be simplified.

Multilevel converters, which can cope with the high voltages required in HVDC transmission, are easily incorporated into the voltage source converter and generate a higher quality voltage waveform than 2-level converters due to faster switching capability and higher numbers of switching steps.

Preferably the synthesized waveforms are identical in shape and magnitude. In such embodiments the third waveform shares the same waveform shape and magnitude as the synthesized waveforms.

In particularly preferred embodiments the shape of each synthesized voltage waveform is sinusoidal so as to match the conventional waveform shape of a three-phase AC power supply.

The multilevel converters of the first and second converter limbs may be controllable to operate at a phase angle displacement between the phases of the synthesized waveforms. In one such embodiment the phase angle displacement is 60 electrical degrees.

A phase angle displacement of 60 electrical degrees means the voltage source converter produces waveforms at the series AC phase connections that reach their instantaneous peak values at different times so as to maintain the power transfer constant over each cycle.

Each of the first and second converter limbs may include at least one inductor connected in series with the multilevel converter, and the or each inductor may be located on either side of the multilevel converter.

The provision of one or more inductors in series with the multilevel converter regulates the current flow in each converter limb.

In a preferred embodiment of the invention the voltage source converter may include a fourth converter limb including a resistive load.

In other preferred embodiments of the invention the voltage source converter may further include DC output terminals for connection to a DC side sink or a DC side source of electrical power.

The multilevel converter included in each of the first and second converter limbs is preferably a chain-link type converter. However, in other embodiments, the multilevel converter may be a single-phase diode clamped converter or a flying capacitor converter.

In one particular embodiment of the invention, each chain-link converter includes a chain of modules connected in series and each module includes at least one pair of semiconductor switches connected in parallel with an energy storage device, the semiconductor switches being controllable in use to provide a continuously variable voltage source.

In such an embodiment the modules are controllable to switch in and out of the chain-link converter, and the energy storage device provided in each module enables the module to provide a voltage step whenever it is switched into the circuit.

Each semiconductor switch preferably comprises an insulated gate bipolar transistor (IGBT).

The use of IGBTs is advantageous because such devices are small in size and weight. IGBTs also have relatively low power dissipation, which minimizes the need for cooling equipment. The use of IGBTs therefore leads to significant reductions in cost, size and weight.

The use of a chain-link converter allows the use of a converter that is unidirectional, i.e. produces voltage steps in one direction only, or bidirectional, i.e. produces voltages steps in both positive and negative polarities.

In order to provide a unidirectional single-phase multilevel converter, the semiconductor switches of each module may be connected with the respective energy storage device in a half-bridge arrangement to define a 2-quadrant unipolar module that can develop zero or positive voltage and can conduct current in both directions.

In order to provide a bidirectional single-phase multilevel converter, the semiconductor switches of each module may be connected with the respective energy storage device in a full-bridge arrangement to define a 4-quadrant bipolar module that can develop positive or negative voltage and can conduct current in both directions.

The energy storage devices provided in the modules of the chain-link converter act to bias the converter. Each of the energy storage devices may be provided in the form of a battery, a fuel cell or a charged capacitor.

Preferred embodiments of the invention will now be described, by way of non-limiting examples, with reference to the accompanying drawings in which:

FIGS. 1a and 1b show schematic circuit arrangements of prior art voltage source converters for HVDC transmission;

FIG. 2 shows a schematic circuit arrangement of another prior art voltage source converter for HVDC power transmission;

Figure 3A:
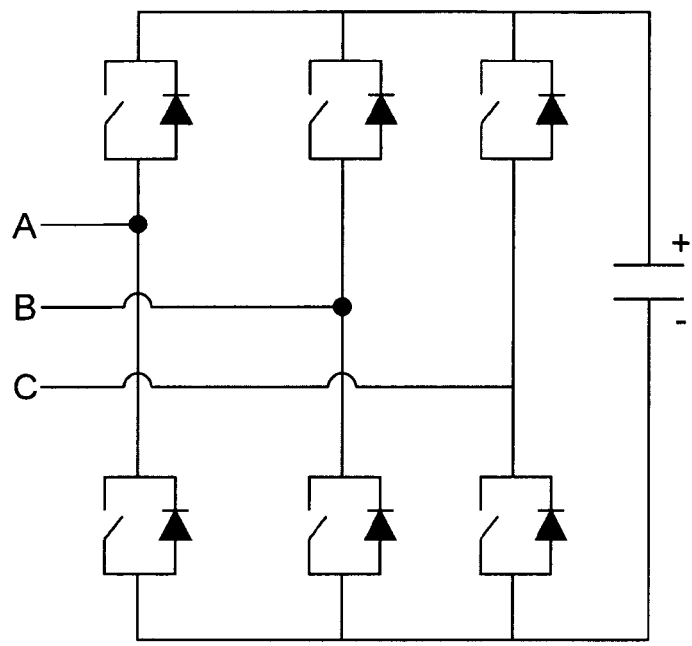
FIGS. 3a and 3b show schematic circuit arrangements of yet further prior art voltage source converters for HVDC power transmission.
Figure 3B:
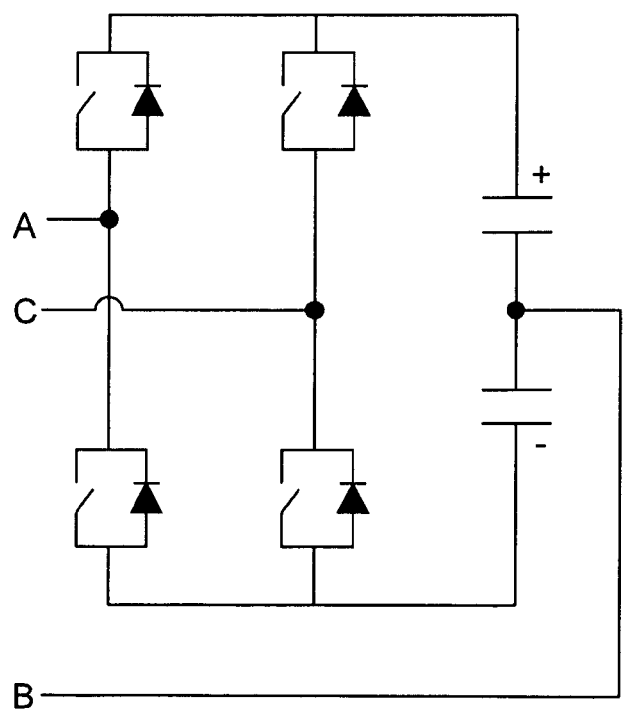
Figure 4:
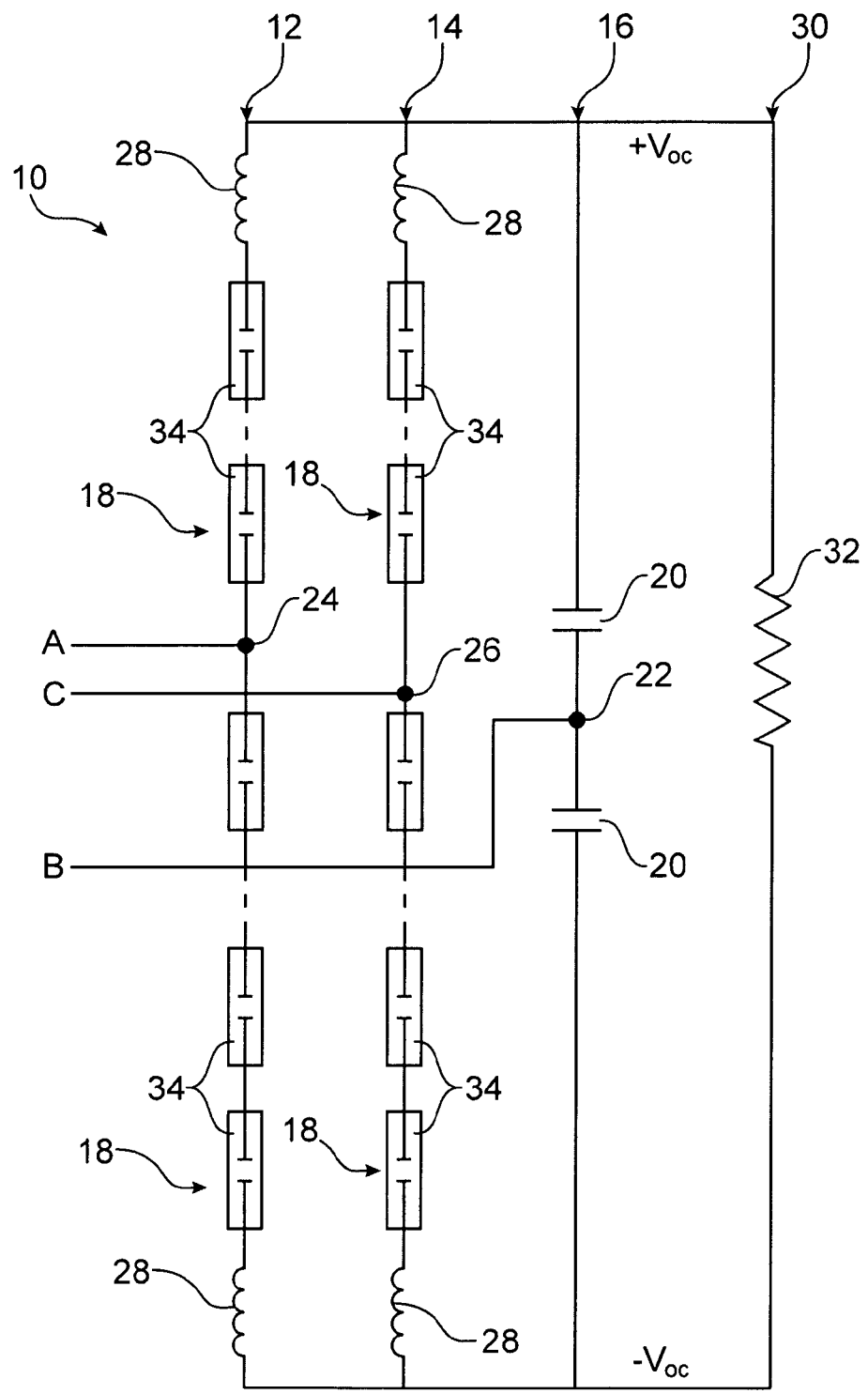
FIG. 4 shows a voltage source converter according to an embodiment of the invention.

A voltage source converter 10 according to an embodiment of the invention is shown in FIG. 4.

The voltage source converter 10 includes first, second and third converter limbs 12,14,16 connected in a bridge circuit arrangement. Each of the first and second converter limbs 12,14 includes a multilevel converter 18 and the third converter limb 16 includes a capacitor 20 on each side of a series AC phase connection 22.

The multilevel converters 18 are controllable to synthesize waveforms at series AC phase connections 24,26 of the first and second converter limbs 12,14.

Synthesizing waveforms at the series AC phase connections 24,26 of the first and second converter limbs 12,14 results in the generation of a third waveform at the series AC phase connection 22 of the third converter limb 16.

In circumstances where the waveforms synthesized at the series AC phase connections 24,26 of the first and second converter limbs 12,14 are identical in shape and magnitude, the waveform generated at the series AC phase connection 22 of the third converter limb 16 will share the same waveform shape and magnitude.

In circumstances where the converter 10 is to be used to provide or draw balanced real power and reactive power from the three phases of an AC network, the shapes of the synthesized waveforms are preferably sinusoidal to match the conventional waveform shape of three-phase AC power supply.

In a conventional three-phase voltage source converter, the switches in each converter limb are operated at a phase angle displacement of 120 electrical degrees to ensure constant power supply over each cycle.

The multilevel converters 18 of the first and second converter limbs 12,14 may be operated at a phase angle displacement between the phases of the synthesized waveforms, the phase angle displacement being preferably 60 electrical degrees.

The operation of the voltage source converter may be explained with reference to the vector diagrams shown in FIGS. 5a and 5b, which assume that the series AC phase connection 22 of the third converter limb 16 is connected to ground (zero volts).

The voltage source converter 10 is operated at a phase angle displacement of 60 electrical degrees between the synthesized waveforms at the series AC phase connections 24,26 of the first and second converter limbs 12,14. The angle between the vectors shown in FIGS. 5a and 5b are equal to the phase angle displacement between the synthesized waveforms.

Figure 5A:
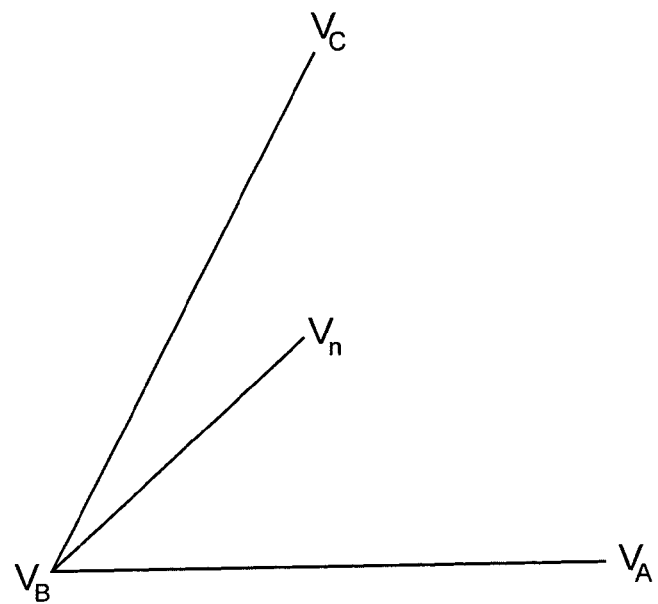
FIGS. 5a and 5b show vector diagrams illustrating the operation of the voltage source converter shown in FIG. 4.

Referring to FIG. 5a, the voltage VA at the series AC phase connection 24 of the first converter limb 12 is equal to one unit voltage with respect to the zero voltage at the series AC phase connection 22 of the third converter limb 16.

The voltage VB at the series AC phase connection 26 of the second converter limb 14 is also equal to one unit voltage with respect of the zero voltage at the series AC phase connection 22 of the third converter limb 16, at 60 degrees with respect to the vector connecting VA and VB.

A neutral voltage VN is calculated by averaging the three voltages at the series AC phase connections 22,24,26. VN is therefore equal to 0.577 unit voltage at 30 degrees with respect to the vector connecting VA and VB and the vector connecting VC and VB.

Figure 5B:
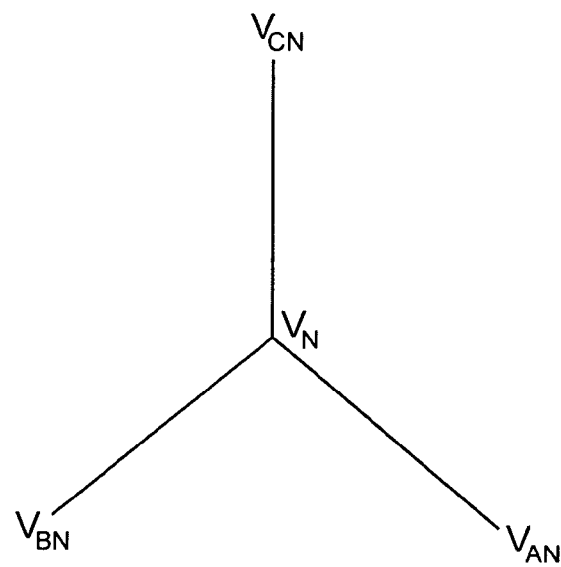

Referring to FIG. 5b, the neutral AC side voltages VAN, VBN and VCN at each series phase connection 22,24,26, with respect to the neutral voltage VN, is equal to 0.577 unit voltage. The angle displacement between any two vectors is equal to 120 degrees, which follows the phase angle displacement between waveforms in a conventional three-phase voltage source converter.

The voltage source converter 10 therefore operates as a three-phase voltage source converter by utilizing neutral AC side voltages VAN, VBN and VCN.

In the embodiment shown in FIG. 4, each of the first and second converter limbs 12,14 includes a pair of inductors 28. The inductors 28 are connected in series on opposite sides of each multilevel converter 18 and regulate the flow of current in the multilevel converter 10.

The voltage source converter 10 also includes a fourth converter limb 30, which comprises a resistor 32 to provide a resistive load.

In other embodiments it is envisaged that the resistive load may be replaced by a DC side sink or a DC side power source from another converter and the 4$^{th}$ limb may therefore be replaced with DC output terminals.

The multilevel converter 18 in each of the first and second converter limbs 12,14 is provided in the form of a chain-link converter. In other embodiments, the multilevel converters 18 may be provided in the form of diode-clamped converters or flying capacitor converters.

Each of the chain-link converters is built up from a series of modules 34, each of the modules 34 including at least one pair of semiconductor switches connected in parallel with an energy storage device. The energy storage device effectively provides a voltage source for each module 34, which enables each module 34 to provide a voltage step when switched into the chain-link converter. Consequently each of the chain-link converters may be controlled in use to provide a continuously variable voltage source through appropriate control of the semiconductor switches.

The circulating current path for the semiconductor switching is contained within the modules 34 giving minimum self-inductance and making the switching operation efficient.

In the embodiment shown in FIG. 4, each of the modules may be unidirectional, i.e. produces voltage steps in one direction only, or bidirectional, i.e. produces voltage steps both positive and negative polarities, or combinations of both.

Figure 7:
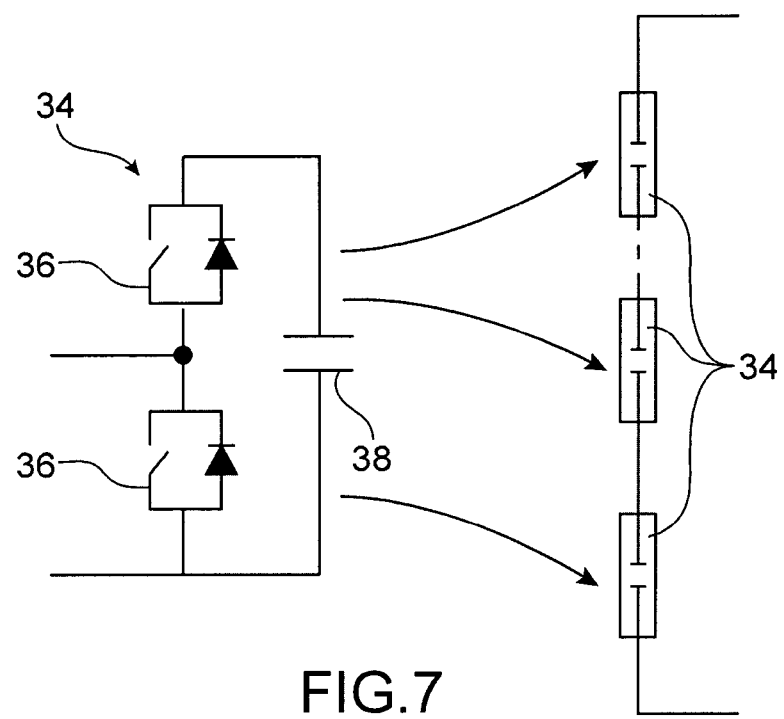
FIG. 7 shows a 2-quadrant unipolar module.

An example of a unidirectional module 34 is shown in FIG. 7 and includes a pair of semiconductor switches 36 in the form of insulated gate bipolar transistors (IGBTs) connected with a capacitor 38 in a half-bridge arrangement to define a 2-quadrant unipolar module that can develop zero or positive voltage and can conduct current in both directions.

Figure 8:
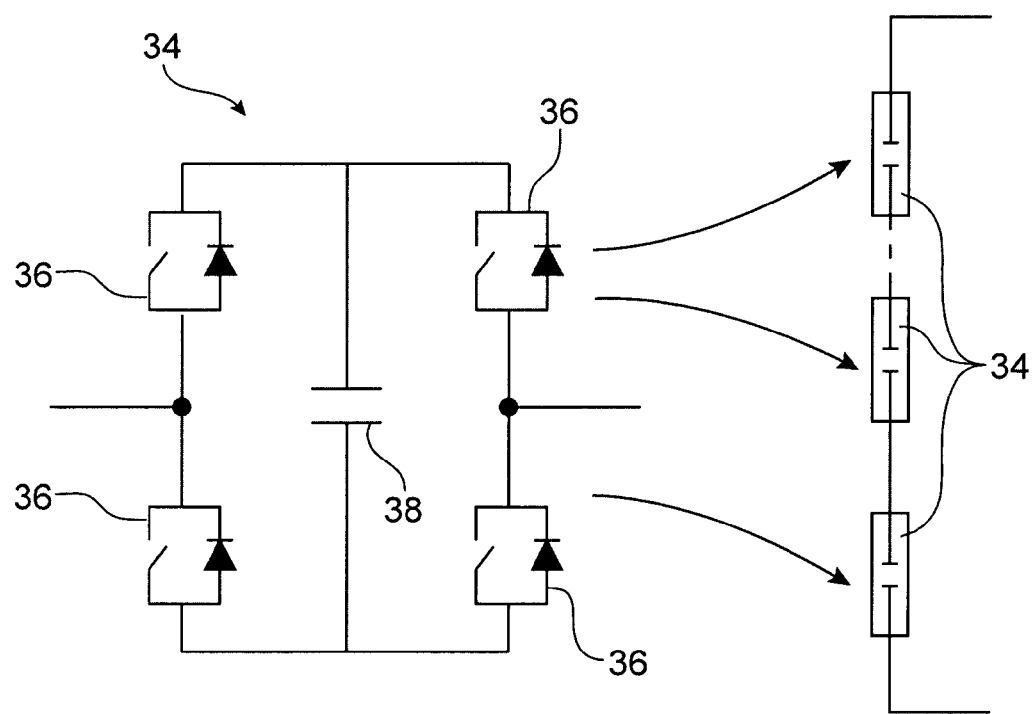
FIG. 8 shows a 4-quadrant bipolar module.

An example of a bidirectional module 34 is shown in FIG. 8 and includes two pairs of semiconductor switches 36 in the form of insulated gate bipolar transistors (IGBTs) connected with a capacitor 38 in a full-bridge arrangement to define a 4-quadrant bipolar module that can develop positive or negative voltage and can conduct current in both directions.

In other embodiments the energy storage device of each of the modules 34 may be provided in the form of a battery or a fuel cell instead of a capacitor.

Figure 6:
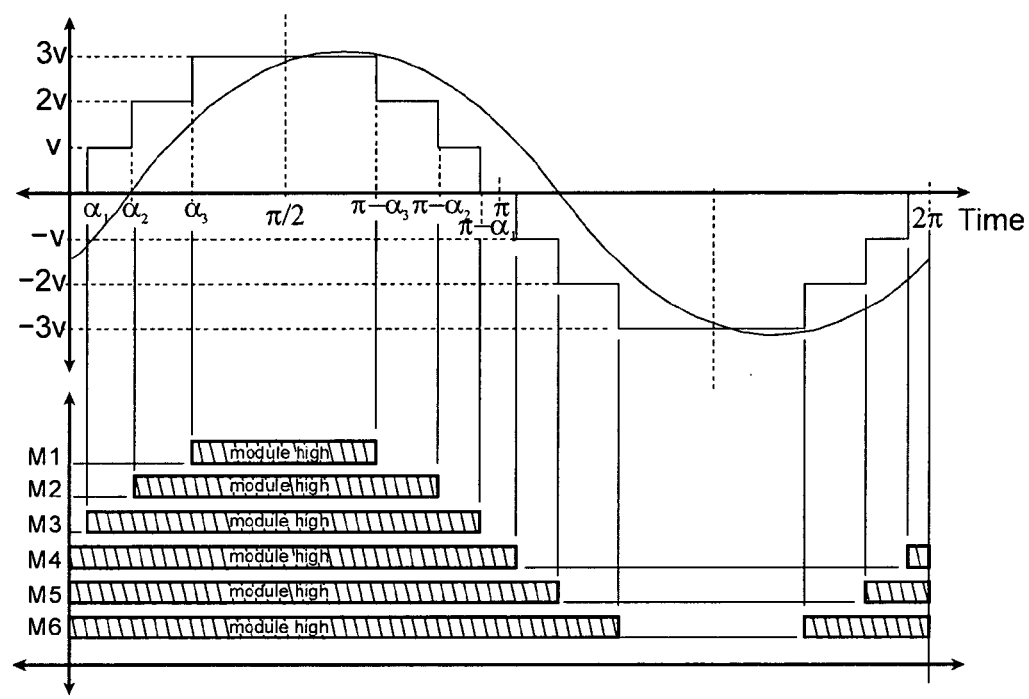
FIG. 6 illustrates the synthesis of a sinusoidal waveform using a chain-link converter.

The modular construction of the chain-link converter allows the capacitor 38 of each of the modules 34 to be switched in and out of circuit using the semiconductor switches 36 to yield the continuously variable voltage source and FIG. 6 demonstrates the synthesis of a 50 Hz power waveform using one of the converters 18 by staggering the switching of the individual modules 34. Although many switching operations are taking place, they are contained within the individual modules 34 and the number of switching operations may be as low as the frequency of the power voltage.

In high power applications, the number of steps will be high (several hundred), and therefore the output waveforms of each multilevel converter 18 will be high quality sinusoids in normal operation.

Other waveform profiles may be synthesized by modifying the switching operations of the multilevel converter 18. In addition the phase angle displacement between the synthesized waveforms may be varied by adjusting the timing of the switching operations of the multilevel converters 18 in the first and second converter limbs 12,14.

The ability to control the synthesis of waveforms through switching operations of the multilevel converters 18 allows the voltage source converter 10 to act as a rectifier, an inverter and to absorb or generate reactive power, as may be required at any instant in time.

Figure 9:
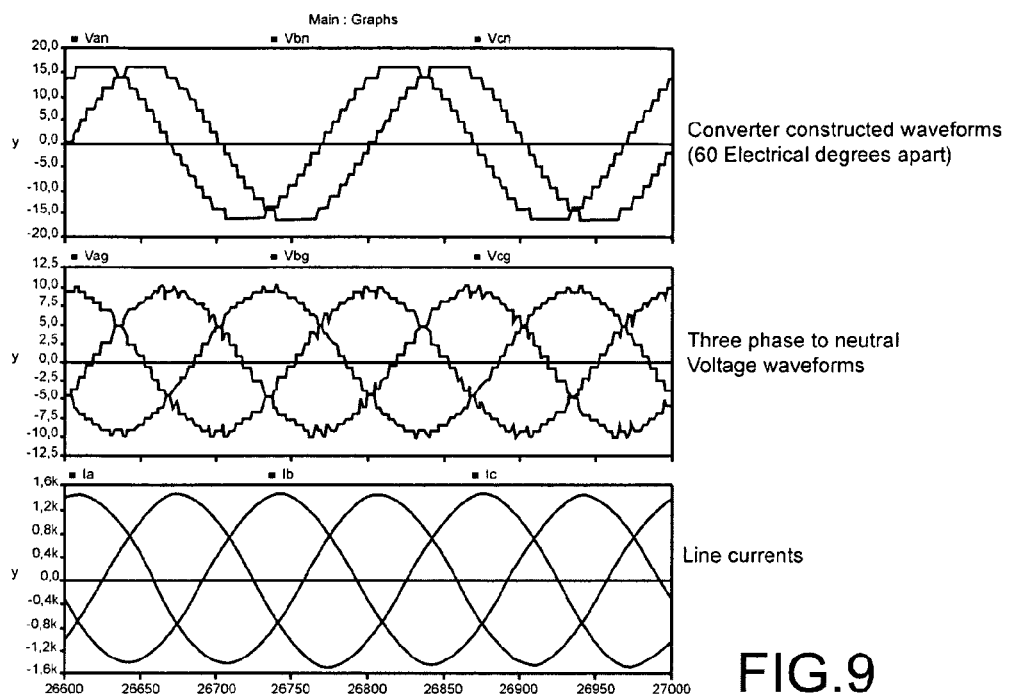
FIGS. 9 and 10 show the converter voltage and current waveforms obtained from a computer model of a relatively low powered converter confirming operation of a voltage source converter according to an embodiment of the invention.
Figure 10:
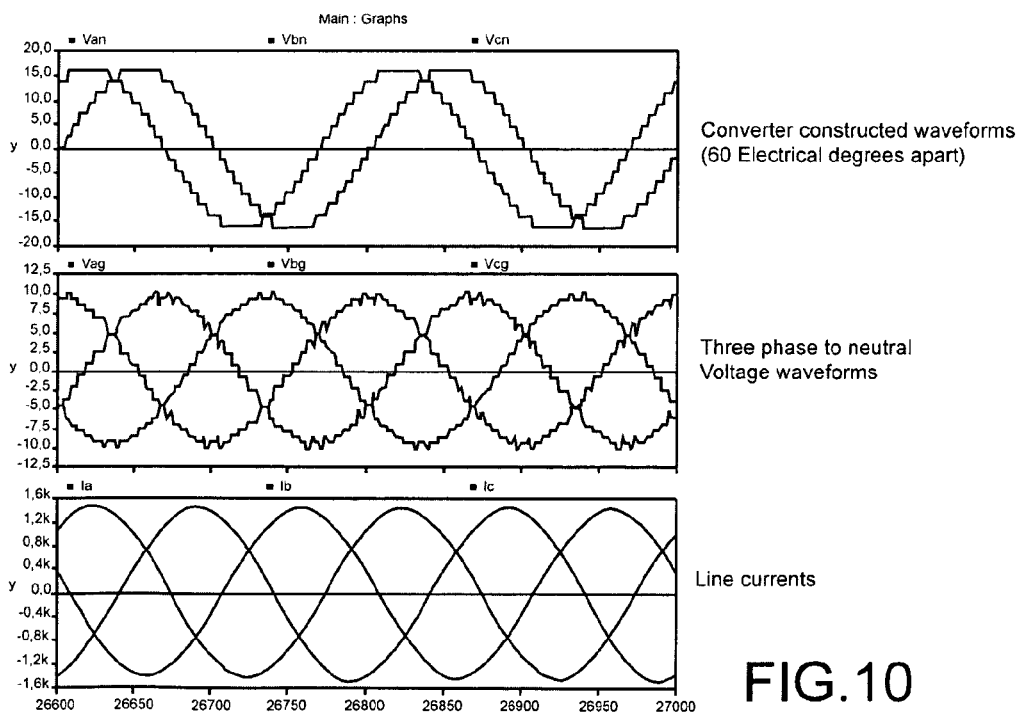

FIGS. 9 and 10 show the converter voltage and current waveforms obtained from a computer model of a relatively low powered converter confirming operation. The model represents a 20 MW scheme operating at 11 kV grid connection and FIG. 9 shows the waveforms obtained when the converter is operating in a rectification mode and FIG. 10 shows the waveforms obtained when the converter is operating in an inversion mode.

For example, controlling the multilevel converters 18 of the first and second converter limbs 12,14 to operate at 60 electrical degrees or other phase angle displacement, and to independently produce sinusoidal or other shaped waveforms allows the voltage transfer ratio between the DC and AC sides of the converter 10 to be improved.

Controlling the multilevel converters 18 of the first and second converter limbs 12,14 to operate at 60 electrical degrees or other phase angle displacement, and to independently produce sinusoidal or other shaped waveforms allows differing amounts of real and reactive power to be drawn from the three phases of an AC network connected to the AC side of the converter 10.

In addition, through control of the semiconductor switches 36 of the modules 34, the voltage source converter 10 may be controlled to enable the magnitude of the fundamental component to be increased by including additional harmonic components in each synthesized waveform. For example, each synthesized waveform may undergo over-modulation using the 3rd harmonic or other triplen harmonic components. It is also possible to provide an active filtering capability by introducing other desirable harmonic components into the waveforms synthesized by the multilevel converters 18.

The voltage source converter 10 may also be controlled to produce voltage waveforms at the AC network connection, to draw desired current waveforms from the AC network or produce a desired DC transmission voltage magnitude.

The invention claimed is:

1. A voltage source converter (10) for use in three-phase high voltage DC power transmission and reactive power compensation, the voltage source converter comprising three converter limbs (12, 14, 16) connected in a bridge circuit arrangement wherein each of first (12) and second (14) converter limbs includes a multilevel converter (18) and a third converter limb (16) includes a capacitor (20) on each side of a series AC phase connection (22), the multilevel converters (18) being a chain-link converter controllable to synthesize waveforms at series AC phase connections (24, 26) of the first and second converter limbs, with each chain-link converter including a chain of modules (34) connected in series and each module includes at least one pair of semiconductor switches (36) connected in parallel with an energy storage device (38), the semiconductor switches being controllable in use to provide a continuously variable voltage source, characterized in that each chain-link converter further includes a combination of:
   modules in which the semiconductor switches (36) of the module are connected with the respective energy storage device in a half-bridge arrangement to define a 2-quadrant unipolar module that can develop zero or positive voltage and can conduct current in both direction, and
   modules (34) in which the semiconductor switches of the module are connected with the respective energy storage device in a full-bridge arrangement to define a 4-quadrant bipolar module that can develop positive or negative voltage and can conduct current in both directions.

2. A voltage source converter according to claim 1 wherein the synthesized waveforms are identical in shape and magnitude.

3. A voltage source converter according to claim 2 wherein each of the synthesized waveforms are sinusoidal.

4. A voltage source converter according to claim 2 wherein the first (12) and second (14) converter limbs are controllable to operate at a phase angle displacement between the phases of the synthesized waveforms.

5. A voltage source converter according to claim 2 further including DC output terminals for connection to a DC side sink or DC side source of electrical power.

6. A voltage source converter according to claim 1 wherein each of the synthesized waveforms are sinusoidal.

7. A voltage source converter according to claim 6 wherein the first (12) and second (14) converter limbs are controllable to operate at a phase angle displacement between the phases of the synthesized waveforms.

8. A voltage source converter according to claim 6 further including DC output terminals for connection to a DC side sink or DC side source of electrical power.

9. A voltage source converter according to claim 6 wherein each of the multilevel converters (18) is a single-phase diode clamped converter or a flying capacitor converter.

10. A voltage source converter according to claim 1 wherein the first (12) and second (14) converter limbs are controllable to operate at a phase angle displacement between the phases of the synthesized waveforms.

11. A voltage source converter according to claim 10 wherein the phase angle displacement is 60 electrical degrees.

12. A voltage source converter according to claim 10 wherein each of the first (12) and second (14) converter limbs includes at least one inductor (28) connected in series with the multilevel converter (18), and each inductor is located on either side of the multilevel converter.

13. A voltage source converter according to claim 10 further including DC output terminals for connection to a DC side sink or DC side source of electrical power.

14. A voltage source converter according to claim 10 wherein each semiconductor switch (36) comprises an insulated-gate bipolar transistor.

15. A voltage source converter according to claim 10 wherein each of the energy storage devices is a battery, a fuel-cell or a charged capacitor (38).

16. A voltage source converter according to claim 10 wherein each of the multilevel converters (18) is a single-phase diode clamped converter or a flying capacitor converter.

17. A voltage source converter according to claim 1 wherein each of the first (12) and second (14) converter limbs includes at least one inductor (28) connected in series with the multilevel converter (18), and each inductor is located on either side of the multilevel converter.

18. A voltage source converter according to claim 17 further including DC output terminals for connection to a DC side sink or DC side source of electrical power.

19. A voltage source converter according to claim 17 wherein each semiconductor switch (36) comprises an insulated-gate bipolar transistor.

20. A voltage source converter according to claim 17 wherein each of the energy storage devices is a battery, a fuel-cell or a charged capacitor (38).

21. A voltage source converter according to claim 17 wherein each of the multilevel converters (18) is a single-phase diode clamped converter or a flying capacitor converter.

22. A voltage source converter according to claim 1 further including DC output terminals for connection to a DC side sink or DC side source of electrical power.

23. A voltage source converter according to claim 22 wherein each semiconductor switch (36) comprises an insulated-gate bipolar transistor.

24. A voltage source converter according to claim 22 wherein each of the energy storage devices is a battery, a fuel-cell or a charged capacitor (38).

25. A voltage source converter according to claim 22 wherein each of the multilevel converters (18) is a single-phase diode clamped converter or a flying capacitor converter.

26. A voltage source converter according to claim 1 wherein each semiconductor switch (36) comprises an insulated-gate bipolar transistor.

27. A voltage source converter according to claim 26 wherein each of the energy storage devices is a battery, a fuel-cell or a charged capacitor (38).

28. A voltage source converter according to claim 26 wherein each of the multilevel converters (18) is a single-phase diode clamped converter or a flying capacitor converter.

29. A voltage source converter according to claim 26 wherein each chain-link converter (18) includes a combination of half-bridge and full-bridge modules.

30. A voltage source converter according to claim 1 wherein each of the energy storage devices is a battery, a fuel-cell or a charged capacitor (38).

31. A voltage source converter according to claim 30 wherein each of the multilevel converters (18) is a single-phase diode clamped converter or a flying capacitor converter.

32. A voltage source converter according to claim 30 wherein each chain-link converter includes modules (34) in which the semiconductor switches of the module are connected with the respective energy storage device in a full-bridge arrangement to define a 4-quadrant bipolar module that can develop positive or negative voltage and can conduct current in both directions.

33. A voltage source converter according to claim 1 wherein each of the multilevel converters (18) is a single-phase diode clamped converter or a flying capacitor converter.

34. A voltage source converter according to claim 33 wherein each semiconductor switch (36) comprises an insulated-gate bipolar transistor.

35. A voltage source converter according to claim 33 wherein each of the energy storage devices is a battery, a fuel-cell or a charged capacitor (38).

36. A voltage source converter according to claim 33 wherein each chain-link converter includes modules (34) in which the semiconductor switches of the module are connected with the respective energy storage device in a full-bridge arrangement to define a 4-quadrant bipolar module that can develop positive or negative voltage and can conduct current in both directions.

37. A voltage source converter according to claim 33 wherein each chain-link converter (18) includes a combination of half-bridge and full-bridge modules.

38. A voltage source converter according to claim 1 wherein each chain-link converter includes modules (34) in which the semiconductor switches of the module are connected with the respective energy storage device in a full-bridge arrangement to define a 4-quadrant bipolar module that can develop positive or negative voltage and can conduct current in both directions.

39. A voltage source converter according to claim 1 wherein each chain-link converter (18) includes a combination of half-bridge and full-bridge modules.

40. A voltage source converter according to claim 39 wherein each of the synthesized waveforms are sinusoidal.

* * * * *